United States Patent [19]

McCracken et al.

[11] Patent Number: 4,697,739
[45] Date of Patent: Oct. 6, 1987

[54] MICROTUBE APPLICATOR SYSTEM

[75] Inventors: Alan McCracken, Paoli, Pa.; Frank J. Dominiani, Jr., Flemington; Edward A. DeJarnette, Jr., Plainsboro, both of N.J.

[73] Assignee: FMC Corporation, Philadelphia, Pa.

[21] Appl. No.: 895,416

[22] Filed: Jul. 31, 1986

[51] Int. Cl.[4] .......................... B05B 1/20; B05B 7/30; B67D 5/52
[52] U.S. Cl. .................................. 239/127; 137/892; 137/566; 222/135; 222/145; 222/255; 239/157; 239/159; 239/172; 239/308; 239/318
[58] Field of Search ............... 239/127, 157, 159, 172, 239/308, 310, 318, 542; 137/892, 893, 894, 895, 566; 366/161, 182; 134/100, 110; 222/133, 135, 145, 255

[56] References Cited

U.S. PATENT DOCUMENTS

| | | |
|---|---|---|
| 515,210 | 2/1894 | Graves . |
| 2,757,044 | 7/1956 | Gerbracht ............... 239/157 |
| 2,774,626 | 12/1956 | Gerbracht ............... 239/157 |
| 3,612,356 | 10/1971 | McVey ............... 239/172 X |
| 3,770,198 | 11/1973 | Mihara ............... 239/310 X |
| 3,910,500 | 10/1975 | Hardison ............... 239/310 |
| 3,926,371 | 12/1975 | Harrell et al. ............... 239/159 X |
| 3,976,087 | 8/1976 | Bolton et al. ............... 239/172 X |
| 4,029,260 | 6/1977 | Herrick ............... 239/310 X |
| 4,456,176 | 6/1984 | Agins ............... 239/310 X |

FOREIGN PATENT DOCUMENTS 228763 6/1960 Canada ............................. 239/157

OTHER PUBLICATIONS

"Dempster Liquijector", Brochure, Dempster Mill Mfg. Co., Beatrice, Neb.
"Jectarow", Agchem Pty. Ltd., Adelaide, South Australia, 1/2/85, (32 pages).

Primary Examiner—Andres Kashnikow
Assistant Examiner—Mary Beth O. Jones
Attorney, Agent, or Firm—Patrick C. Baker; H. Robinson Ertelt

[57] ABSTRACT

Liquid agrichemicals such as pesticides are applied to soil or crops in a continuous stream at low flow rate from microtubes without need for a mixing tank and without clogging of the microtubes during downtime, by a system mountable on a farm vehicle, the system comprising a liquid agrichemical supply tank, a water supply tank, a first conduit connecting the agrichemical supply tank to a manifold feeding the microtubes, a first pump in the conduit, water entrainment means (such as a venturi) and a second, suction pump in the conduit, a second conduit between the water supply tank and the venturi, and other conduits, valves and pressure regulators as appropriate to control the directions and rates of flow, and for recirculation or flushing. By such control, water may be entrained by the venturi for inline admixing with the agrichemical, or the venturi optionally may be bypassed for application of undiluted agrichemical.

13 Claims, 3 Drawing Figures

MICROTUBE APPLICATOR SYSTEM

TECHNICAL FIELD

This invention relates to apparatus and systems for applying liquid agrichemicals to crops or to soils prior to or in conjunction with planting, and more particularly to injection systems employing microtube applicators.

BACKGROUND OF THE INVENTION

Liquid agrichemicals have advantages over solid agrichemicals, e.g., granular pesticides, in certain applications. Liquid agrichemicals provide faster response, particularly under dry conditions, and in the case of pesticides provide more effective control of soil insects than solids. Where root uptake is required, as in the application of systemic pesticides, liquids may be the only practical form. Soil application of liquid pesticides avoids the hazards of handling seed which has been pretreated with the pesticide. Moreover, when a liquid pesticide is applied to soil via microtube injection, for example, for control of soil nematodes and insects, very low volumes of pesticide can be used but with great accuracy. Similar benefits accompany the application of other liquid agrichemicals such as herbicides and fertilizers.

In microtube injection of a liquid agrichemical such as a pesticide, the active agent customarily is diluted to a required concentration in a mixing tank and pumped to one or more manifolds which feed a plurality of plastic injection tubes typically having internal diameters of about 0.75–2.00 mm. For effective injection and metering into the soil or into crops, the pesticide must flow from the microtubes in a continuous stream as opposed to spraying or dripping. The continuous flow and low flow rate are achieved by long tube length, the resulting pressure drop being a function of the length as well as the internal diameter of the tubing.

A known microtube applicator is the "Jectarow" system introduced by Agchem Pty. Ltd., Adelaide, South Australia, for application of a liquid, unformulated nematicide having a viscosity equal to or less than water in cereal farming. In this system, a piston pump with pressure relief valve, a pesticide supply tank and microtubes with manifold are mounted on a seed planter for injection of diluted nematicide into furrows during seeding. The pump meters the pesticide and may be driven electrically using a pressure regulator or mechanically by a drive wheel in contact with a ground wheel of a tractor. The microtubes are oriented to rows to be injected by guide tubes mounted below the manifold. A plurality of manifolds connected by tees may be employed, each feeding a plurality of microtubes of equal length, the number of microtubes depending on the number of rows to be injected.

In use, continuous flow of liquid pesticide formulation in the microtubes of the Jectarow apparatus normally prevents blockage by dust or foreign matter which may enter the system. However, if the flow is interrupted (for example, by suspension of application due to sudden storms or overnight delays), the liquid pesticide in the diluted product tends to separate. The microtubes thus clog easily, resulting in substantial economic loss due to down-time for cleaning and/or the expense of replacing components of the microtube applicator system.

SUMMARY OF THE INVENTION

It has now been found, in accordance with one aspect of the invention, that clogging of microtubes in microtube liquid agrichemical applicator systems, due to separation of agrichemical from diluted admixtures, can be eliminated or minimized by inline mixing of the agrichemical with water as contrasted with premixing or in situ tank mixing in conventional systems. The inline mixing is achieved by removing the mixing tank of conventional microtube applicator systems, installing water-entraining means and an auxiliary pump in the feed conduit from the agrichemical supply tank of the system to the one or more manifolds supplying the microtubes, and providing other conduits and suitable valving means to supply water for calibration, dilution or backwashing as needed.

In another aspect of the invention, the valving means and conduits of the aforesaid system optionally are selected and controlled to enable application of the liquid agrichemical either diluted or undiluted, and to recirculate diluted agrichemical for optimum mixing.

In still other aspects, the valving means include pressure and/or volume regulator valves and the lengths and internal diameters of the microtubes are selected to enable application of a liquid agrichemical in continuous streams, either diluted or undiluted, and at low, controlled flow rates.

These and other aspects, features and advantages of the invention will be apparent from the description which follows.

DETAILED DESCRIPTION

Figure 1:
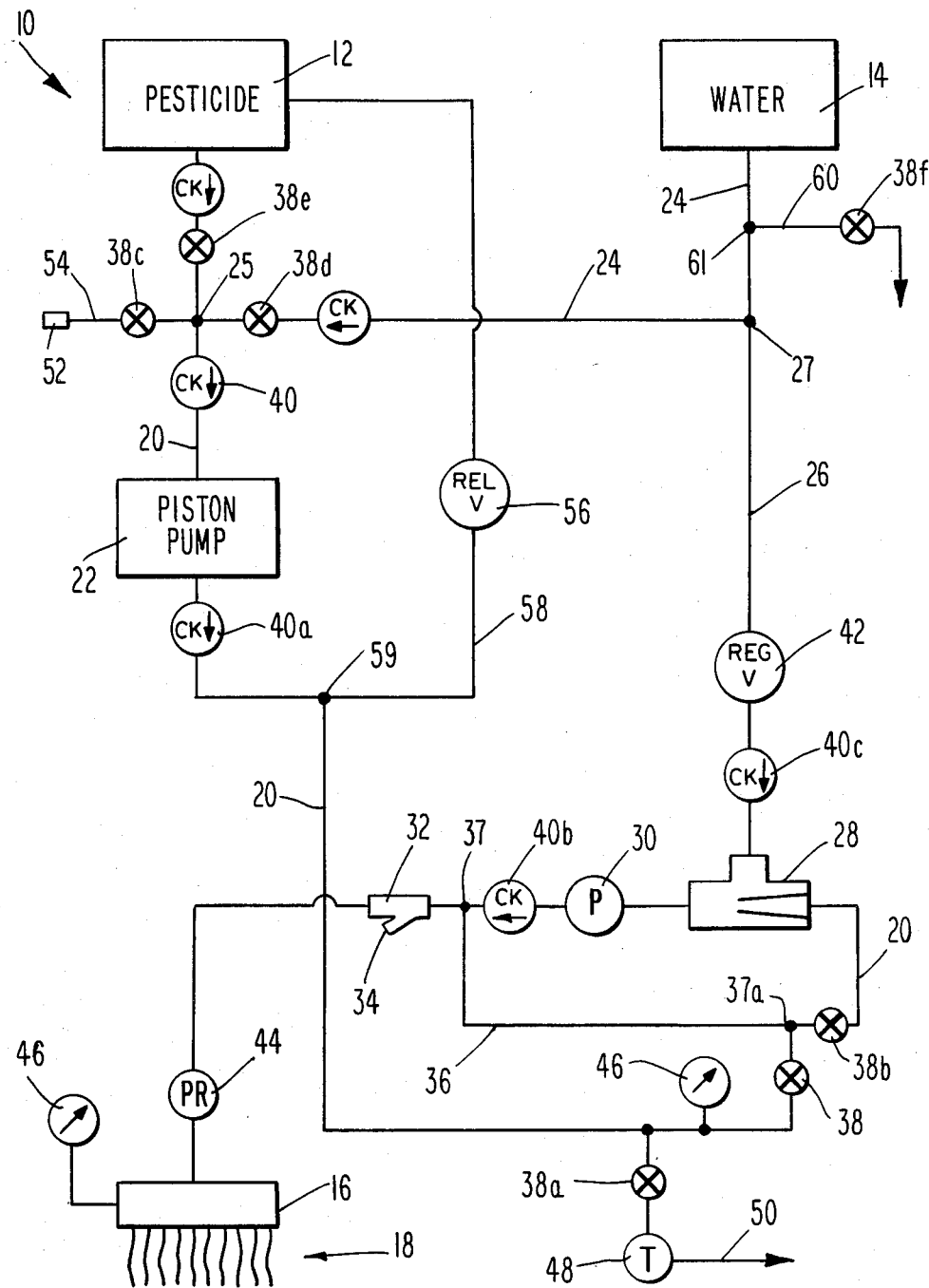
FIG. 1 is a schematic of one embodiment of liquid agrichemical applicator system of the invention.

With reference to FIG. 1, a microtube applicator system 10 of the invention includes a first, liquid agrichemical supply tank 12, for supply of a liquid pesticide for example; a second, water supply tank 14; a manifold 16 for feeding liquid agrichemical to a plurality of microtubes 18; a first conduit 20 to connect tank 12 and manifold 16; and a primary or first pump, such as a variable rate, metering, piston pump 22, in conduit 20. The pump 22 may be actuated mechanically or electrically in a predetermined manner in response to the speed of the vehicle upon which the pump is mounted or the pump may be actuated electronically through conventional relays and switches controlled by an operator or by programmed, automatic sequencing, in accordance with known mechanisms, instrumentation and procedures. A suitable fluid pressure is about 15 to 40 psi but other pressures may be employed depending on the rate of application desired.

A second liquid conduit 24 connects water supply tank 14 to first conduit 20 upstream of pump 22 at tee 25. A third conduit 26 is conveniently connected to water supply tank 14 as a branch from conduit 24 at tee 27 as shown, but could also be directly connected to tank 14. The other (exit) end of conduit 26 connects to a water entraining means, such as venturi 28, mounted in conduit 20. Venturi 28 entrains water from conduit 26 by flow through conduit 20 of liquid agrichemical under suction from second pump 30. Optionally, a strainer 32 removes particulate matter which may have entered the system as dust or other solids. Strainer 32 may be provided with a port or flush valve 34 for back flushing or other clean out operation. The strainer mesh depends on the viscosity of the liquid agrichemical, a lower mesh (e.g., 20 to 100 mesh) being selected for a more viscous material and vise versa.

A fourth conduit 36 connected as a loop off conduit 20 at tees 37 and 37a bypasses venturi 28 and second pump 30 by closure of valve 38, thus providing an alternate path for undiluted liquid agrichemical formulations. However, conduit 36 is also useful as a recirculation loop for additional mixing of agrichemical and entrained water in the dilution mode of operation of the system. This is effected by opening valve 38b as further described below.

Valve means are mounted in conduits 20, 24, 26 and 36 as needed to control rate and/or direction of flow. For example, ball valves 38 and 38a to 38f prevent reversal of flow in accordance with desired modes of operation of the system as described below, and check valves 40, 40a, 40b and 40c regulate flow rate in conduits 20 and 26. In addition, a regulator valve 42 permits precise control of flow of water in conduit 26 and a pressure regulator 44 in conduit 20 between manifold 16 and pump 30 controls fluid pressure for continuous, even flow of agrichemical from microtubes 18. When system 10 is used for inline mixing of liquid agrichemical and water in venturi 28 in the application of diluted agrichemical, either regulator valve 42 or pressure regulator 44 is sufficient. When the agrichemical is applied undiluted (neat), pressure regulator 44 may be used but is not required. It will be understood and appreciated that the several valves and regulators may be positioned other than as shown in FIG. 1.

Optionally but desirably, system 10 includes pressure gauges 46 to record pressure in line 20 and manifold 16, a dripless fitting 48 on exit conduit 50 for accurate calibration or flushing of the system (described below), a hose coupling or similar fitting 52 on an exit conduit 54 for convenient flushing or calibration by connection to a water outlet at a barn or other location, a relief valve 56 in a return conduit 58 branching from line 20 at tee 59 for release of excessive fluid pressure, and a drain conduit 60 branching from conduit 24 at tee 61.

Figure 2:
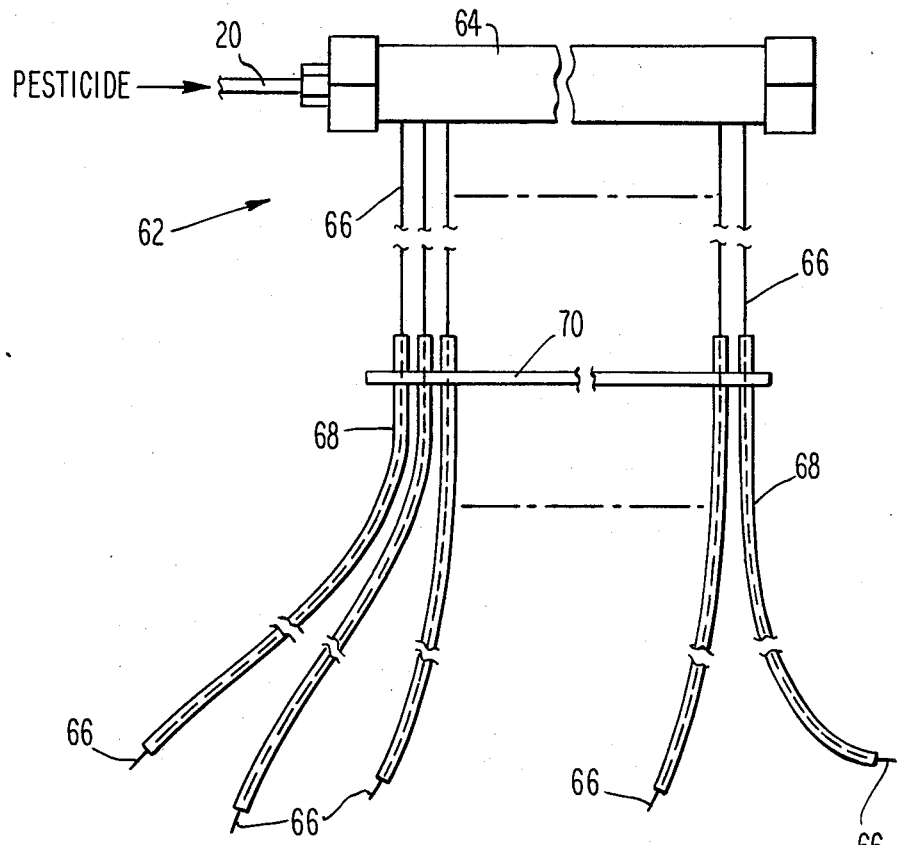
FIG. 2 is a partially fragmentary, diagrammatic view of a manifold and microtube assembly useful in an applicator system of the invention.

FIG. 2 shows some details of a manifold and microtube applicator assembly 62 useful in the invention. With reference thereto, a liquid agrichemical such as a pesticide enters the chamber 64 of a manifold via conduit 20 and passes through a plurality of spaced apart microtubes 66 extending through guide tubes 68 mounted in bracket 70. The guide tubes and bracket orient the microtubes in the desired directions for injection of pesticide or other agrichemical to predetermined locations based on the number and spacing of furrows or crops to be treated. The microtubes 66 are cut to the same length so that the flow rates of agrichemical therethrough will be equal.

Figure 3:
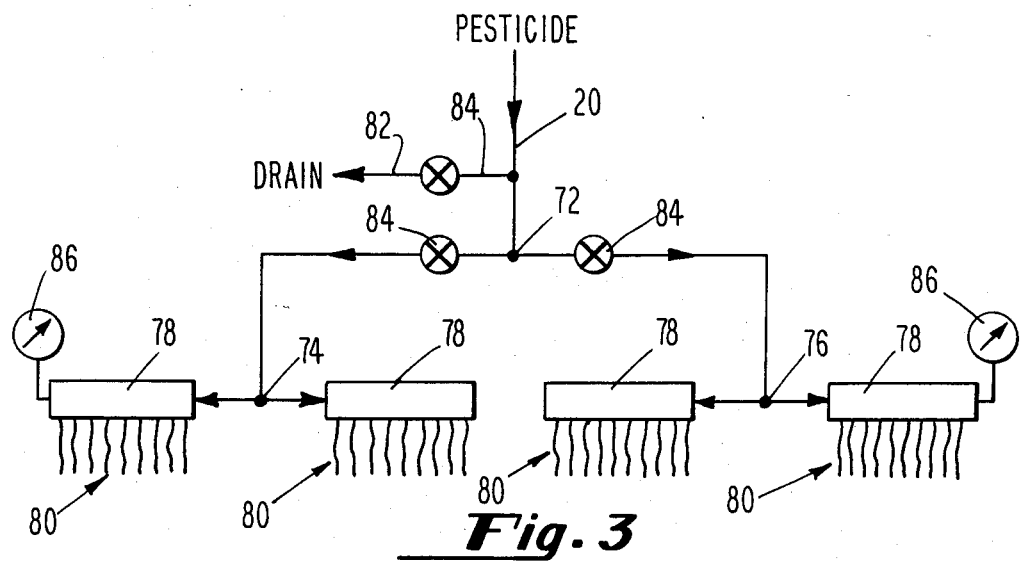
FIG. 3 is a diagrammatic view of a plurality of manifolds and microtube assemblies useful in the invention.

FIG. 3 shows how four manifold and microtube assemblies, representative of any number of such assemblies, may be interconnected for simultaneous injection of agrichemical into parallel furrows or crop rows. In the representative system illustrated, liquid pesticide pumped via a line 20 as described in FIG. 1 branches at tee 72 to secondary tees 74 and 76 from where it enters manifolds 78 for injection via microtubes 80. Optionally, the system contains a drain conduit 82, check valves 84 and pressure gauges 86. The form and placement of the valves, gauges and drain line may be as desired for most efficient operation of the system.

In a first mode of operation of the system 10, for application of an undiluted (therefore more viscous) liquid agrichemical such as a pesticide, valves 38a, 38b, 38c and 38d will be closed. Typically, for a flow rate of about 10-50 ml/min through the microtubes of a liquid agrichemical having a viscosity of about 30% greater than water for row application to crops such as cotton, corn, soybeans and strawberries, the microtubes will be about 3 meters long and have nominal internal diameters of about 2 mm. The microtubes conveniently are formed of a flexible inert plastic such as polyethylene or nylon but other inert materials can be used. A variable rate piston pump 22 (FIG. 1) operating at about 15–30 rpm will be effective. The tractor or other vehicle upon which the system 10 is mounted usually is run at about 6 mph.

In a second mode of operation of system 10, for application of a liquid agrichemical such as the same pesticide as in the first mode but wherein the pesticide is diluted inline, only valves 38a, 38c, 38d and 38f will be closed and water will flow to venturi 28 for entrainment by the pesticide under suction from pump 30. Recirculation of the liquid counterclockwise through conduit 36 promotes good mixing. The concentration of pesticide in the mixed product may be controlled by regulator valve 42 or alternatively by pressure regulator 44. Typically, for a flow rate of neat pesticide equivalent to about 5–60 ml/min/microtube with the piston pump 22 operating as in the first mode, the pesticide will be diluted to a concentration of about 10% by volume, using microtubes 3 meters long and having nominal internal diameters of about 1 mm. Additional dilution of the pesticide will further increase the flow rate through the microtubes.

To flush the system 10 in accordance with a third mode of operation of the system, valves 38, 38c, 38e and 38f are closed and valves 38a and 38d will be open. Water may then be directed from tank 14 through conduit 24 to conduit 20 to flush pesticide or other agrichemical through fitting 48 and conduit 50 out of the system. Flushing and/or draining of the system via one or more of fitting 52 and valve 34 and conduits 54 and 36, respectively, is also convenient, upon suitable control of the various valves. The system may also be flushed by connection to an external water supply, as at fitting 52, again by suitable control of the valves.

For a flow rate calibration mode of operation of system 10, the planting speed for the carrier vehicle is first determined, e.g., seconds required to travel 100 meters. The flow rate is then read from a chart for the particular row spacing and the agrichemical supply tank 12 half-filled with water. The piston pump 22 is operated and the pressure set to an approximate value. The water discharged from the microtubes is then collected and the flow rate calculated. Finally, the pressure is adjusted as necessary to attain the desired flow rate.

Although the above description has been directed to preferred embodiments of the invention, it will be understood and appreciated by those skilled in the art that other variations and modifications may be made without departing from the spirit and scope of the invention, and therefore the invention includes the full range of equivalents of the features and aspects set forth in the appended claims.

What is claimed is:

1. A liquid agrichemical applicator system mountable on a farm vehicle and adapted for inline mixing and application of the liquid agrichemical to soil or crops in a continuous, diluted or undiluted, stream at low flow rate, comprising the combination of:
   (a) a first, liquid agrichemical supply tank;
   (b) a second, water supply tank;
   (c) a manifold;
   (d) a plurality of microtubes connected to the manifold for dispensing liquid agrichemical;
   (e) a first liquid conduit connecting the first tank and the manifold;
   (f) a first pump in the first liquid conduit;
   (g) a second liquid conduit connecting the second tank and the first conduit upstream of the first pump;
   (h) a third liquid conduit having one end connected to the second tank;
   (i) means in the first conduit and connected to the other end of the third conduit for entraining water from the second tank;
   (j) a second pump in the first conduit between the water entrainment means and the manifold;
   (k) a fourth liquid conduit connected at both ends to the first conduit and arranged to bypass the water entrainment means and the second pump or to recirculate the liquid agrichemical to the water entrainment means and the second pump; and
   (l) valve means in each of the first, second and third conduits adapted to control flow therethrough.

2. The system of claim 1 wherein the water entraining means (i) comprises a venturi.

3. The system of claim 1 further including
   (m) a pressure regulator in the first conduit between the manifold and the second pump.

4. The system of claim 1 further including
   (n) a volume regulator valve in the third conduit.

5. The system of claim 1 further including (m) a pressure regulator in the first conduit between the manifold and the second pump, and (n) a volume regulator valve in the third conduit.

6. The system of claim 1 wherein the first pump is a variable rate piston pump responsive to speed of the vehicle upon which the system is mountable.

7. The system of claim 1 further including
   (o) a strainer in the first conduit between the manifold and the second pump.

8. The system of claim 1 further including (m) a pressure regulator in the first conduit between the manifold and the second pump, and wherein the first pump (f) is a variable rate piston pump responsive to speed of the vehicle upon which the system is mountable.

9. The system of claim 1 further including (n) a volume regulator valve in the third conduit, and wherein the first pump (f) is a variable rate piston pump responsive to the speed of the vehicle upon which the system is mountable.

10. The system of claim 1 further including (m) a pressure regulator in the first conduit between the manifold and the second pump and (n) a volume regulator valve in the third conduit, and wherein the first pump (f) is a variable rate piston pump.

11. The system of claim 10 further including (o) a strainer in the first conduit between the manifold and the second pump.

12. The system of claim 1 further including
   (p) a return conduit between the first tank and the outlet of the first pump, and
   (q) a relief valve in the return conduit.

13. The system of claim 1 wherein the water entraining means (i) comprises a venturi and the system includes at least one of (m) a pressure regulator in the first conduit between the manifold and the second pump and (n) a volume regulator valve in the third conduit; and further including (o) a strainer in the first conduit between the manifold and the second pump, (p) a return conduit between the first tank and the outlet of the first pump and (q) a relief valve in the return conduit, and wherein the first pump (f) is a variable rate piston pump.

* * * * *